US008196630B2

(12) United States Patent
Busch et al.

(10) Patent No.: US 8,196,630 B2
(45) Date of Patent: Jun. 12, 2012

(54) THERMALLY-CONTROLLED FRICTION BONDING OF WORKPIECE LAYERS (75) Inventors: James William Busch, Maineville, OH (US); Michael John Mers-Kelly, Hartford, ME (US)

(73) Assignee: The Procter and Gamble Company, Cincinnati, OH (US)

( * ) Notice: Subject to any disclaimer, the term of this patent is extended or adjusted under 35 U.S.C. 154(b) by 133 days.

(21) Appl. No.: 12/483,383

(22) Filed: Jun. 12, 2009

(65) Prior Publication Data
US 2010/0313526 A1 Dec. 16, 2010

(51) Int. Cl.
*B32B 41/00* (2006.01)

(52) U.S. Cl. ........ 156/359; 156/378; 156/555; 156/582; 53/374.4; 53/477; 53/479

(58) Field of Classification Search ............... 156/359, 156/378, 555, 582; 53/374.4, 477, 479
See application file for complete search history.

(56) References Cited

U.S. PATENT DOCUMENTS

| | | | |
|---|---|---|---|
| 2,958,366 A | 1/1960 | Conti | |
| 3,798,110 A | 3/1974 | Von Gunten | |
| 4,796,525 A | 1/1989 | Schiel et al. | |
| 4,854,984 A | 8/1989 | Ball et al. | |
| 4,889,522 A | 12/1989 | Gietman, Jr. | |
| 4,919,738 A | 4/1990 | Ball et al. | |
| 5,218,905 A | 6/1993 | Bolte et al. | |
| 5,282,349 A | 2/1994 | Siegel | |
| 5,678,390 A * | 10/1997 | Pruett et al. | 53/450 |
| 5,791,125 A | 8/1998 | Kallner | |
| 5,830,296 A | 11/1998 | Emenaker et al. | |
| 5,935,379 A | 8/1999 | Frantz et al. | |
| 6,537,403 B1 | 3/2003 | Blenke et al. | |
| 6,540,854 B2 | 4/2003 | Couillard et al. | |
| 6,733,605 B1 | 5/2004 | Lamping et al. | |
| 6,733,606 B2 | 5/2004 | Miyamoto et al. | |
| 7,059,103 B2 | 6/2006 | Ninomiya et al. | |
| 7,117,912 B2 * | 10/2006 | Mister et al. | 156/351 |
| 7,182,827 B2 | 2/2007 | Davis et al. | |
| 2003/0233813 A1 | 12/2003 | Leslie et al. | |
| 2006/0011291 A1 | 1/2006 | O'Dowd | |
| 2007/0137762 A1 | 6/2007 | Topolkaraev et al. | |
| 2008/0093018 A1 | 4/2008 | Selle et al. | |

FOREIGN PATENT DOCUMENTS

WO WO-2008/070190 A2 6/2008

OTHER PUBLICATIONS

PCT Search Report, International App. No. PCT/US2010/038067, mail date Sep. 8, 2010, 14 pages.

* cited by examiner

*Primary Examiner* — George Koch
(74) *Attorney, Agent, or Firm* — Megan C. Hymore; James E. Oehlenschlager (57) ABSTRACT

A system for controlling the strength of seals imparted to workpiece layers by a sealing roll and an anvil roll, the sealing roll and the anvil roll arranged on opposing sides of a conveyed web of workpiece layers, heating elements provided on at least one of the rolls, temperature sensors provided on the at least one of the rolls, and a controller in communication with the sensors and in operable communication with the heating elements. The sealing roll includes a textured sealing surface, the textured sealing surface being divided into a plurality of regions, the texture of a first of the regions being different from a texture of a second of the regions. By controlling the temperature of the respective regions, detrimental effects of anvil wear on the strength of the seal imparted to the workpiece layers may be offset, increasing the service life of rolls.

16 Claims, 10 Drawing Sheets

THERMALLY-CONTROLLED FRICTION BONDING OF WORKPIECE LAYERS

FIELD OF THE INVENTION

This disclosure relates generally to bonding portions of workpiece layers, such as wrapper material, and more particularly, to a bonding apparatus and method utilizing a patterned sealing roll and an anvil roll having thermally controlled regions.

BACKGROUND OF THE INVENTION

The use of a patterned sealing roll and an anvil roll that utilize pressure to effect seals along wrapped articles is well known in the product packaging arena. Patterned sealing rolls and anvil rolls utilize a combination of pressure and temperature to form the seals. Typically, the seal is accomplished by pressing a sealing roll and an anvil roll together with either a constant loading force or at a very small constant gap to create pressure on substrates or workpiece layers used in forming a wrapper and being fed between the sealing roll and the anvil roll. The high pressure on the substrates extrudes the substrates, creating a very thin membrane of substrate between the pattern surface of the sealing roll and the opposing sealing roll, which serves as an anvil. It is theorized that the rapid extrusion creates molecular friction and heat within the substrate membrane, causing the substrate to momentarily melt at the bond sites. The sealing roll and the anvil roll can also be heated to provide additional heat to what is typically a very thin membrane of the substrate. Since the membrane is very thin, there is adequate heat transfer to fuse and mix the substrate layers even though the residence time is very short. Higher process speed creates more internal friction, but less residence time. Typically with heated systems, a higher temperature setpoint is used for the rolls with higher speed. The pattern of the sealing roll has relief areas or grooves around the perimeter of the pattern to provide sufficient void volume for the extruded/melted material that is being extruded, melted and mixed, thereby forming a bead of molten material around each bond site. Once the bond site passes the rolls, the bead of molten material quickly cools and forms a bond of two or more layers of substrate.

While achieving a minimum seal strength is desirable to ensure adequate wrapper integrity and avoid premature opening of the product package, achieving too strong of a bond can be detrimental, as it can increase the difficulty of opening the wrappers, i.e., peel strength, to levels that are unacceptable to consumers. It is recognized that, during the service life of a given patterned sealing roll and anvil roll, the bond imparted to workpiece layers tends to increase peel strength. The problem of the peel strength increasing is believed and understood to be attributable, in part, to the increased area of the exposed textured surface of the patterned roll as the protuberances, or individual raised elements forming the textured patterns of the roll, wear down, as well as to increased contact due to pitting of the surface of the anvil roll, as explained in further detail below.

With respect to wrappers for products having two or more sealing zones of varying peel strength, the desirability of controlling the seal strength of one of the sealing zones may be more acute than in another of the sealing zones. For instance, it may be desirable for a first sealing zone of the wrapper to have a higher peel strength than an adjacent second sealing zone. The relatively low peel strength of the second sealing zone is conducive to initiating peeling of the wrapper to access a product contained therein, while the relatively stronger bond formed along the first sealing zone is preferably a more permanent seal.

SUMMARY OF THE INVENTION

Over the service life of a conventional patterned sealing roll and anvil roll, it is typical for the peel strength of workpiece layers, such as wrappers, bonded between the patterned sealing roll and a cooperating anvil roll to increase. This increase in peel strength is believed to be attributable to several factors: First, there is increased friction due, in part, to greater surface area contact through the web of workpiece layers between the exposed textured surface of the patterned sealing roll and the smooth surface of the anvil roll as the protuberances forming the textured patterns of the sealing roll wear down. Additionally, wear or pitting occurs over time on the smooth cylindrical anvil surface, wherein saucer-shaped depressions are formed by protuberances of the patterned sealing roll lapping themselves into the smooth anvil surface. These factors are known in the art as "anvil wear". Over the service life of the patterned sealing roll and anvil roll, as the web of workpiece layers passes between the patterned sealing roll and the anvil roll, the tendency for the protuberances of the patterned sealing roll lapping themselves into the smooth anvil surface results in a relative increase in contact area of the individual protuberances and the workpiece layers. As opposed to merely two-dimensional contact between the protuberances and the workpiece layers when the anvil roller surface is smooth, there is three dimensional contact as the protuberances become increasingly embedded, albeit only momentarily, into the worn depressions in the surface of the anvil roll.

It is found that controlling the temperature of the surface of a patterned sealing roll is an effective manner of counteracting the phenomenon of increased bond strength over the service life of a given patterned sealing roll cooperating anvil roll. According to the present disclosure, one or each of a sealing roll and an anvil roll is provided with a plurality of heaters disposed along discrete regions or quadrants of the roll. The heaters are controlled by a controller that receives real-time temperature data from sensors disposed in the rolls. The rolls of the present disclosure are divided into a plurality of discrete regions or quadrants by gaps along the sealing surface of the sealing roll and the (initially) smooth cylindrical surface of the anvil roll. The gaps preferably extend radially inward, and assist in maintaining a distinct difference in temperature between respective regions or quadrants.

In a preferred embodiment, a cantilevered patterned sealing roll and a cooperating cantilevered anvil roll are provided, in an opposing relationship, along a chute supporting workpiece layers to be bonded, such as a web of wrapper material to be sealed around a product that has been placed or dropped into the wrapper material in an upstream operation. The sealing roll has a patterned sealing surface divided into four quadrants, as is the anvil roll, and the sealing roll and anvil roll are registered with one another such that corresponding quadrants of the respective rolls simultaneously engage the web of workpiece layers. A first quadrant of the sealing roll is provided with a texture having relatively large protuberances that are preferably rhomboidal in shape.

The first quadrant imparts a first seal having a relatively high bond or peel strength along a web of wrapper material. A second quadrant of the sealing roll, which is disposed adjacent from the first quadrant, but with the first and second quadrants having a gap therebetween, has a texture having, at least initially, relatively small protuberances that are also preferably rhomboidal in shape. The second quadrants impart a lower bond or peel strength along the web of wrapper material. A third quadrant of the sealing roll may have a texture comprising protuberances of a size similar to those of the first quadrant, and a fourth quadrant may have a texture comprising protuberances of a size similar to those of the second quadrant. The protuberances of at least the second and fourth quadrants also may be tapered inwardly with increasing radial distance from an axis of rotation of the roll, such that the exposed ends of the protuberances increase in surface area as they wear down. When used to bond wrappers having two sealing zones along a longitudinal edge, a complete revolution of the sealing roll results in sealing the longitudinal edge of two successive wrappers along the web, which may then be severed in one or more downstream end sealing and cutting operations.

Thermal sensors, such as "Hotset 29114" 100-ohm resistive thermal detectors (or "RTD's") within each of the sealing roll and the anvil roll communicate real-time data indicative of the temperature along the sealing surface of each of the quadrants of the sealing roll and anvil roll to a controller. It will be appreciated that it is not necessary to provide the RTD's immediately at the sealing surface of the sealing roll or the smooth cylindrical surface of the anvil roll, but rather, with data concerning the thermal conductivity of the rolls, the RTD's may be spaced radially inwardly of the contact surface, and still provide reliable data corresponding to the approximate contact surface temperature along the circular sector of the sealing roll surface and along the circular sector of the anvil roll surface. If the controller determines the contact surface temperature of any particular quadrant of the sealing roll or the anvil roll is too high, the controller signals a switch associated with one or more heating elements, such as 100 W "Watlow E1A66-E24T" resistive cartridge heaters, within that quadrant to shut off the heating element(s). As a result, the contact surface of that quadrant cools down, and the bond imparted to the web of wrapper material by that quadrant is comparatively not as strong as if the contact surface temperature remained higher. Likewise, if the controller determines the temperature of any particular quadrant of the sealing rolls is too low, such that the bonds imparted to the web of wrapper material by such quadrant may be too weak, then the controller signals a switch associated with one or more heating elements within that quadrant to turn the heating element(s) on. The controller is preferably programmed to maintain like quadrants of a given roller at substantially the same temperature, such that the temperatures along the first quadrant are substantially the same as the temperatures along the third quadrant, and the temperatures along the second quadrant are substantially the same as the temperatures along the fourth quadrant.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
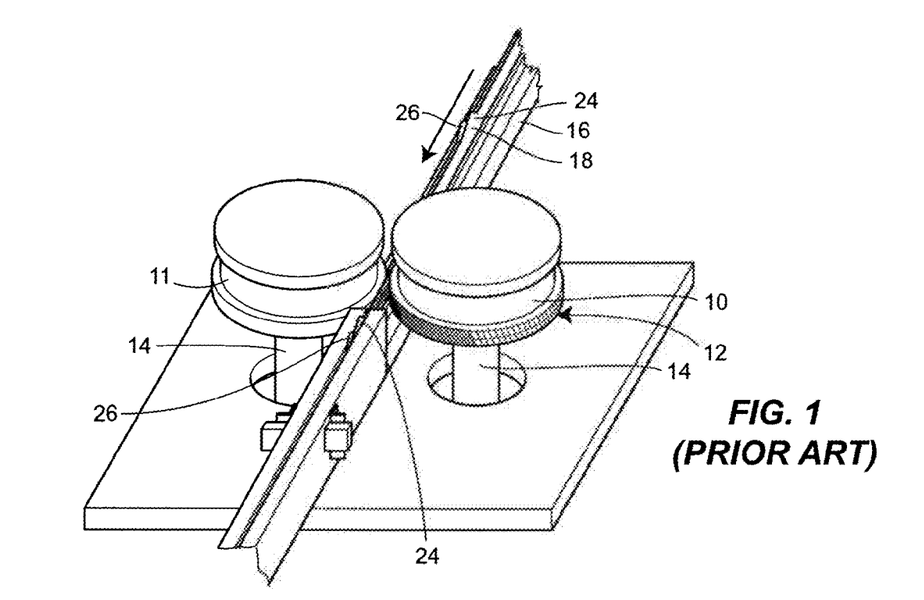
FIG. 1 is a perspective view of a pair of conventional cantilevered patterned sealing roll and a cooperating anvil roll arranged on opposite sides of a web handling chute.

A conventional arrangement of a sealing roll 10 and an anvil roll 11, wherein the sealing roll 10 employs a textured sealing surface 12, is illustrated in FIG. 1. The sealing roll 10 and the anvil roll 11 are each preferably provided in a cantilevered fashion on a rotatable shaft or support arm 14, with each being in the form of a rotary drum disposed about a driven shaft, the shaft being driven by a motor. Rotation of the rotary drum is fixed relative to rotation of the shaft or support arm 14, such that rotation of the support arm 14 rotates the sealing roll 10 or the anvil roll 11. The sealing roll 10 and the anvil roll 11 are provided on opposite sides of a web handing chute 16, which supports a web 18 of workpiece layers, such as wrapper material, to be sealed to one another between the sealing roll 10 and the anvil roll 11. For certain consumer products, such as tampons, it is preferable for the wrapper to be provided with zones of different seal strength, such as a region of relatively low seal strength to facilitate initiation of peeling the wrapper open, and an adjacent region of relatively high seal strength, intended to be a more permanent seal in that it is more difficult to peel. To achieve zones of different seal strength, the texture of the sealing surface 12 of the sealing roll 10 comprises protuberances arranged in at least two different densities and sizes, with a first plurality of relatively large protuberances 20 along a first "C" region, and a second plurality of relatively small protuberances 22 along a second "B" region.

Figure 2:
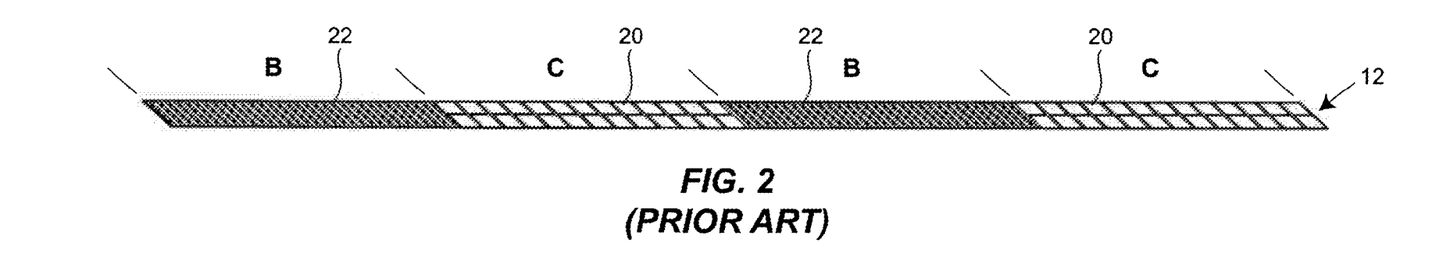
FIG. 2 is a linear representation of the patterned sealing surface regions of the conventional patterned sealing roll of FIG. 1, through a complete revolution of the sealing roll.
Figure 3:
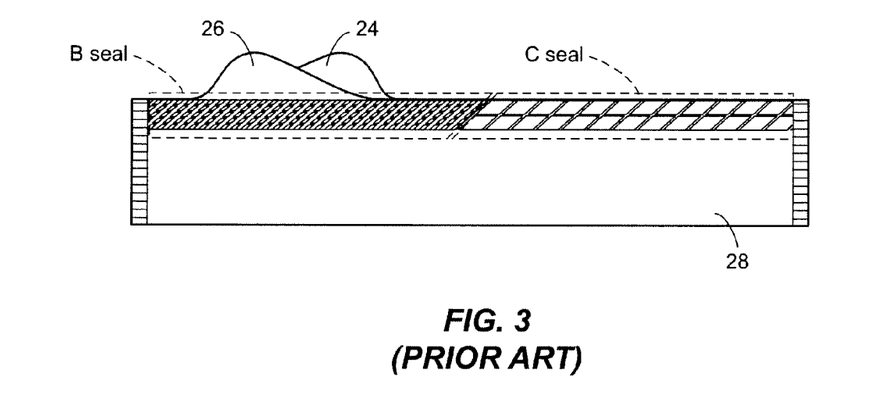
FIG. 3 is a front plan view of a wrapper for a feminine hygiene product having longitudinally extending first and second sealing regions of different seal strength.

As illustrated in FIG. 2, the sealing surface 12 may be divided into four quadrants, such that a complete revolution of the sealing roll 10 (right-to-left along the linear representation of the patterned sealing surface regions of one of the conventional patterned sealing rolls of FIG. 1) imparts a first sealing zone, designated herein as the "C seal," to the web of workpiece layers 18, a second sealing zone, designated herein as the "B seal," followed by another C seal and then another B seal. The web of workpiece layers 18 is then processed in one or more downstream end seal and cutting operations to divide the web into a plurality of individually-wrapped packages, each provided with a C seal and a B seal, such as that illustrated in FIG. 3. The web of workpiece layers 18 may be provided with offset wings 24, 26 that, when sealed and formed into a wrapper 28, can be used to facilitate peeling the wrapper 28 open.

The protuberances 20, 22 are preferably rhomboidal in shape. The protuberances 22 of at least the second and fourth quadrants (i.e., those in the "B" regions) may also be tapered inwardly with increasing radial distance from an axis of rotation of the roll, such that the exposed ends of the protuberances 22 increase in surface area as they wear down. In general, however, it will be recognized that the bonding pattern can be any shape that can be machined into a surface of the sealing rolls 10. In some cases, simple orthogonal grooves are machined to form small squares, rectangles, rhombuses or parallelograms. Electric discharge machining (EDM) is also routinely used to produce more complex shapes.

Figure 4:
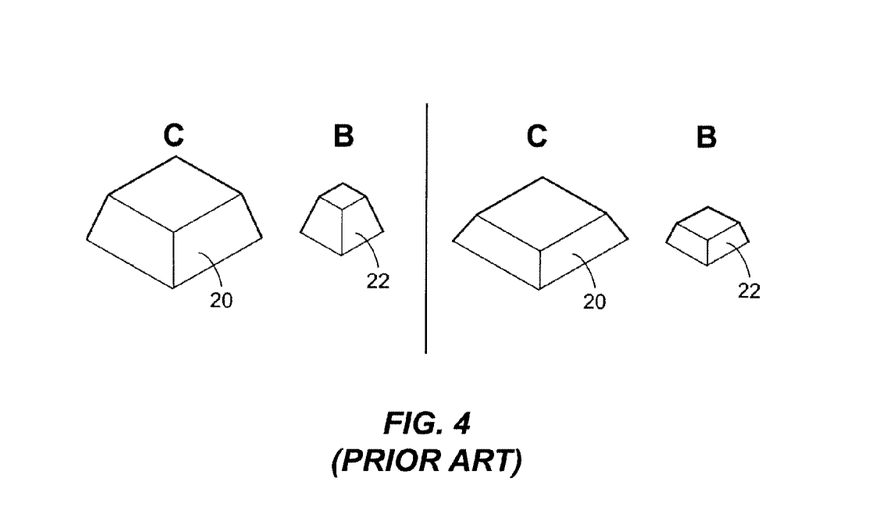
FIG. 4 is an enlarged perspective view of a protuberance from a first sealing surface region of a sealing roll and a protuberance from a second sealing surface region of the sealing roll, illustrating wear of the protuberances over the service life of the sealing roll.

As shown in FIG. 4, as a result of anvil wear, the protuberances 20 along the C regions and the protuberances 22 along the B regions wear down, resulting in a greater exposed surface area of the tips of the protuberances. Additionally, wear or pitting in the smooth cylindrical anvil surface results in three dimensional, larger contact area with the workpiece layers 18 because the protuberances 20, 22 press the workpiece layers 18 not only against, but into the depressions, which are typically saucer-shaped, worn into the surface of the anvil roll 11. While the seal strength imparted to the wrapper in the C seal may already be intended as a more permanent seal, such that any increased peel strength due to anvil wear in that zone is of little consequence, the seal strength imparted to the wrapper in the B seal may increase to an unfavorable extent over the service life of the sealing rolls 10. In practice, it is found that the peel strength of the C seals does not appreciably increase over the service life of the sealing roll 10 (but rather, decreases to some degree, believed to be due to perforation of the workpiece layers 18, as discussed in greater detail below), but that the peel strength of the B seals significantly increases as a result of anvil wear.

Figure 5:
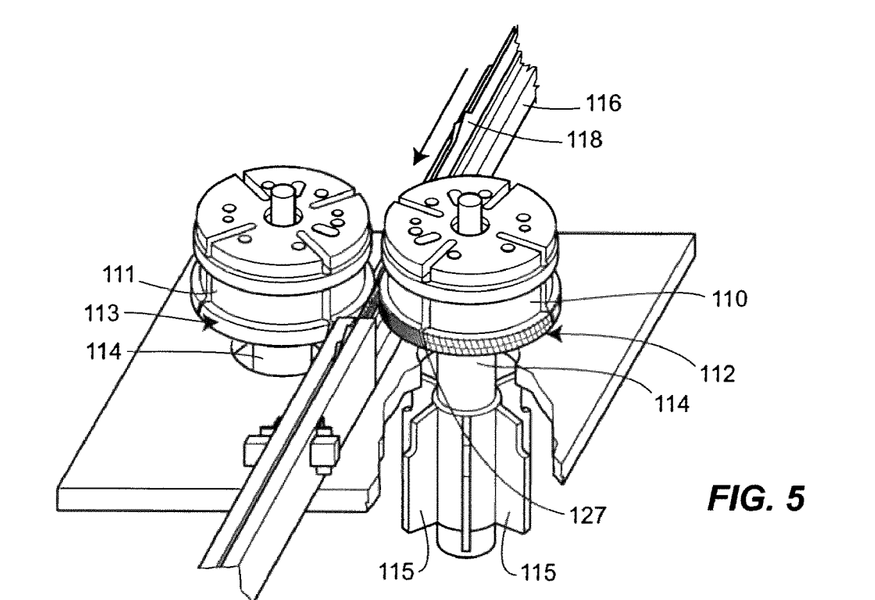
FIG. 5 is a perspective view of a patterned sealing roll and a cooperating anvil roll of the present disclosure, arranged on opposite sides of a web handling chute.
Figure 6:
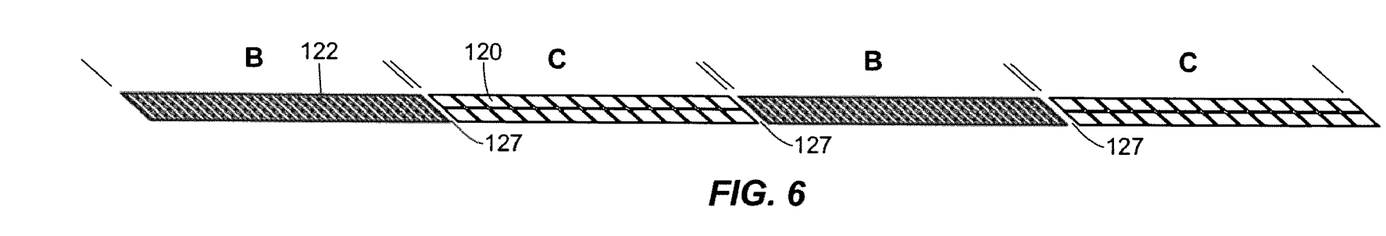
FIG. 6 is a linear representation of the patterned sealing surface regions of the patterned sealing roll of FIG. 5, through a complete revolution of the sealing roll.
Figure 7:
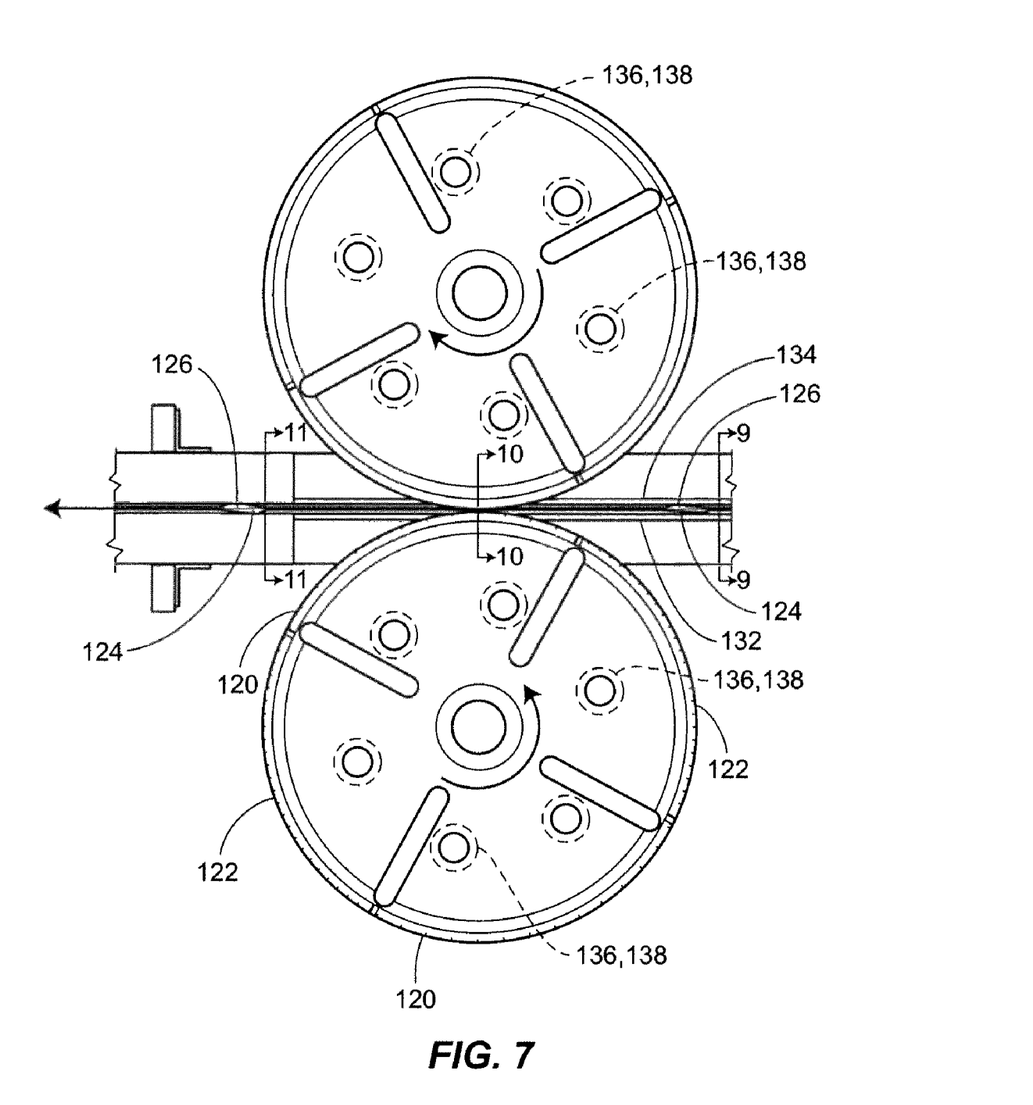
FIG. 7 is a top plan view of a patterned sealing roll and a cooperating anvil roll of the present disclosure, on opposite sides of a web handling chute, illustrating locations of heating elements within distinct quadrants of the sealing roll and of the anvil roll.
Figure 8:
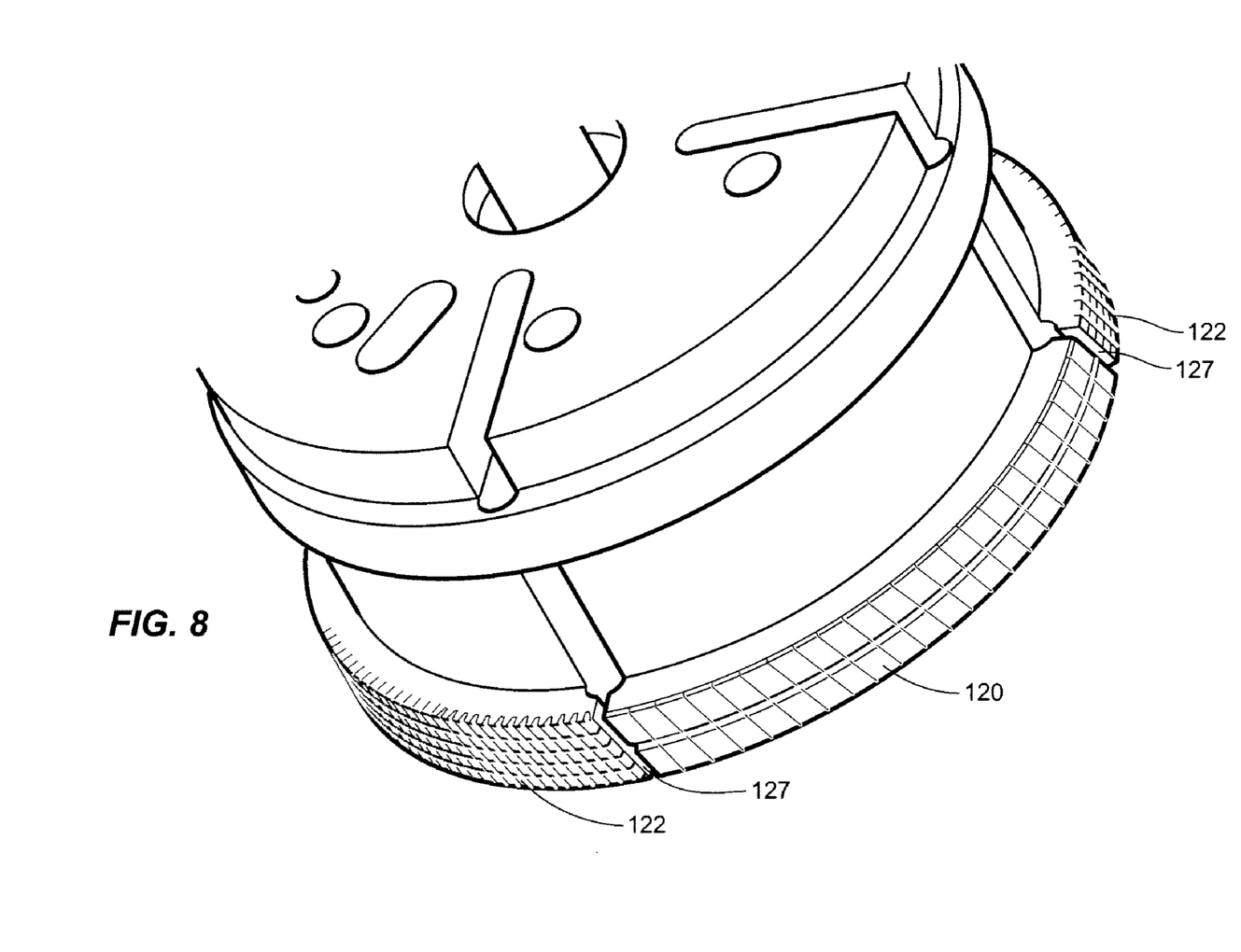
FIG. 8 is a perspective view, partially broken away, of a sealing roll of the present disclosure.

Turning now to FIG. 5, a patterned sealing roll 110 and an anvil roll 111 of the present disclosure, with the patterned sealing roll 110 having a textured sealing surface 112 and the anvil roll 111 having a contact surface 113, are illustrated. The patterned sealing roll 110 and the anvil roll 111 are preferably supported in a cantilevered fashion on rotatable support arms 114 that include one or more cooling fins 115, and are provided on opposing sides of a web handling chute 116. A web of workpiece layers 118, such as wrapper material, is supported along the length of the web handling chute 116. The textured sealing surface 112 of the sealing roll 110 is divided into four quadrants, as (preferably) is the cylindrical anvil surface of the anvil roll 111. Like the sealing surface 12 of the conventional sealing roll 10 discussed above, the texture of the sealing surface 112 of the sealing roll 110 comprises protuberances arranged in different densities and sizes, with a first plurality of relatively large protuberances 120 along a first "C" region, and a second plurality of relatively small protuberances 122 along a second "B" region. However, unlike the sealing surface 12 of the conventional sealing roll 10, a gap 127 is provided between each of the adjacent quadrants of the textured sealing surface 112. The purpose of the gaps 127, which extend radially inwardly, as well as axially along each of the sealing roll 110 and the cylindrical anvil surface of the anvil roll 111, is to thermally isolate the quadrants of the textured sealing surface 112 (or the cooperating portions of the anvil roll 111) from one another. The gaps 127 are also preferably angled or curvilinear along the width of the textured sealing surface 112 or along the width of the contact surface 113, i.e. in an axial direction of the patterned sealing roll 110 and the anvil roll 111.

In a particularly preferred embodiment of the present disclosure, the first set of protuberances 120 may be formed as 0.5 mm×0.5 mm rhombuses on a 2.2 mm pitch in the machine direction and on a 1.5 mm pitch normal to the machine direction. All grooves between the rhombuses defining the protuberances 120 are machined using a 60° included angle. The second set of protuberances 122 may be formed as 2 mm×2 mm rhombuses on a 2.85 mm pitch in the machine direction and on a 3 mm pitch normal to the machine direction. All grooves between the rhombuses defining the protuberances 122 are machined using a 60° included angle.

Figure 9:
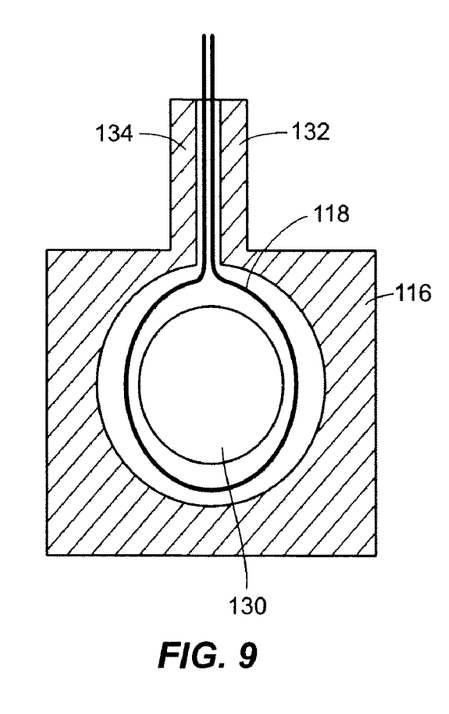
FIG. 9 is a cross-sectional view of the web handling chute of FIG. 7, upstream of the sealing roll and anvil roll of the present disclosure, taken along lines 9-9 of FIG. 7.
Figure 10:
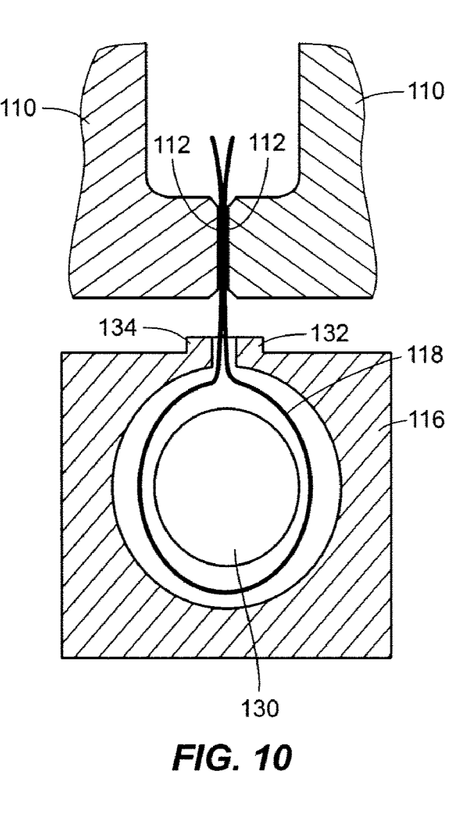
FIG. 10 is a cross-sectional view of the web handling chute of FIG. 7, at the location of the sealing roll and anvil roll of the present disclosure, taken along lines 10-10 of FIG. 7.
Figure 12:
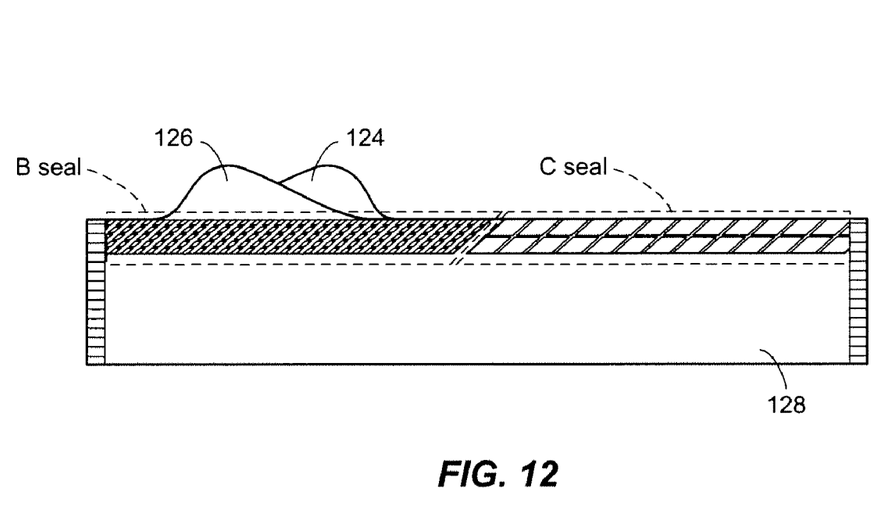
FIG. 12 is a front plan view of a wrapper for a feminine hygiene product having longitudinally extending first and second sealing regions of different seal strength, with the wrapper layers bonded using the sealing roll and anvil roll of the present disclosure.

The web of workpiece layers 118 may be provided with offset wings 124, 126, like the wrapper 28, to facilitate peeling of a B seal of the resulting wrapper 128 (see FIG. 12). In a manner consistent with conventional product wrapping operations, the web of workpiece layers 118 may initially be folded into a "V" shape (not shown), and a product 130 may be dropped into the web of workpiece layers 118. As illustrated in FIG. 9, still upstream of the patterned sealing rolls 110, the web of workpiece layers 118 then passes into a channel of the web handling chute 116, with the legs of the "V" shape urged toward one another by walls 132, 134 of the web handling chute 116, over the product 130 about which the web of workpiece layers 118 is to be sealed. In the vicinity of the patterned sealing roll 110 and the anvil roll 111, the web handling chute 116 includes a window along which the walls 132, 134 do not extend as high, enabling the textured sealing surfaces 112 of the patterned sealing roll 110 to engage the substantially smooth cylindrical surface 113 of the anvil roll 111, with the legs of the "V" shape of the web of workpiece layers 118 therebetween (see FIG. 10).

Figure 11:
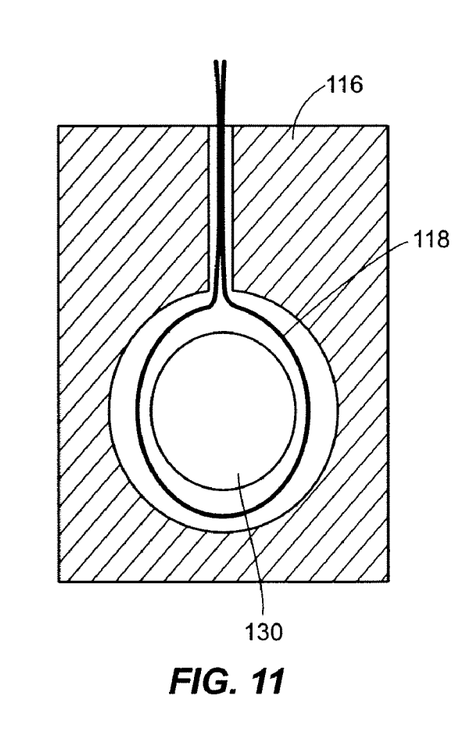
FIG. 11 is a cross-sectional view of the web handling chute of FIG. 7, downstream of the sealing roll and anvil roll of the present disclosure, taken along lines 11-11 of FIG. 7.

As illustrated in FIG. 11, which is a cross-section downstream of the patterned sealing roll 110 and anvil roll 111, the sealed web of workpiece layers 118 is bounded on both sides of the now-sealed regions, and conveyed to a location at which end sealing and cutting operations are performed.

It has been found that by controlling the temperature of the textured sealing surface 112 in the respective quadrants, it is possible to offset the effects of anvil wear on the strength of the B seals and C seals along a wrapper 128. Preferably, temperature of each region or quadrant of the sealing roll 110 is optimized so as to maintain seal strength tolerance as closely to the desired seal strength as possible, while minimizing hole formation in the workpiece layers 118. Depending on the sharpness, pressure, and temperature of the protuberances 120, 122 along the textured sealing surface of the sealing roll, the protuberances 120, 122 may perforate the workpiece layers 118. Because perforations weaken the integrity of the seal, it is desired to maintain the temperature of the regions of the sealing surface within ranges that do not result in perforation of the workpiece layers 118. For a wrapper 128 appropriate for use with consumer products having two sealing zones, a first of which being a "C seal" having a relatively high peel strength and a second of which being a "B seal" having a relatively low peel strength to facilitate opening of the wrapper, it is found that a temperature range of about 125° C. to about 140° C. is preferable for a C zone of the textured sealing surface 112 so as to maximize seal strength and minimize hole formation, and a temperature range of about 115° C. to about 155° C. is preferable for a B zone of the textured sealing surface 112.

In a preferred embodiment, temperature of the textured sealing surface 112 of the patterned sealing roll 110, as well as the temperature of the substantially smooth quadrants of the cooperating anvil roll 111, are controlled using one or more heating elements 136, such as 100 W "Watlow E1A66-E24T" resistive cartridge heaters, in each quadrant of the patterned sealing roll 110 and the anvil roll 111. The heating elements 136 are disposed within the patterned sealing roll 110, spaced radially inwardly of the textured sealing surface 112. Likewise, additional heating elements 136 may be disposed within the anvil roll 111, spaced radially inwardly of the substantially smooth cylindrical surface 113. A plurality of thermal sensors 138, such as "Hotset 29114" 100-ohm resistive thermal detectors ("RTD's"), are also disposed within the patterned sealing roll 110 and the anvil roll 111.

Figure 13:
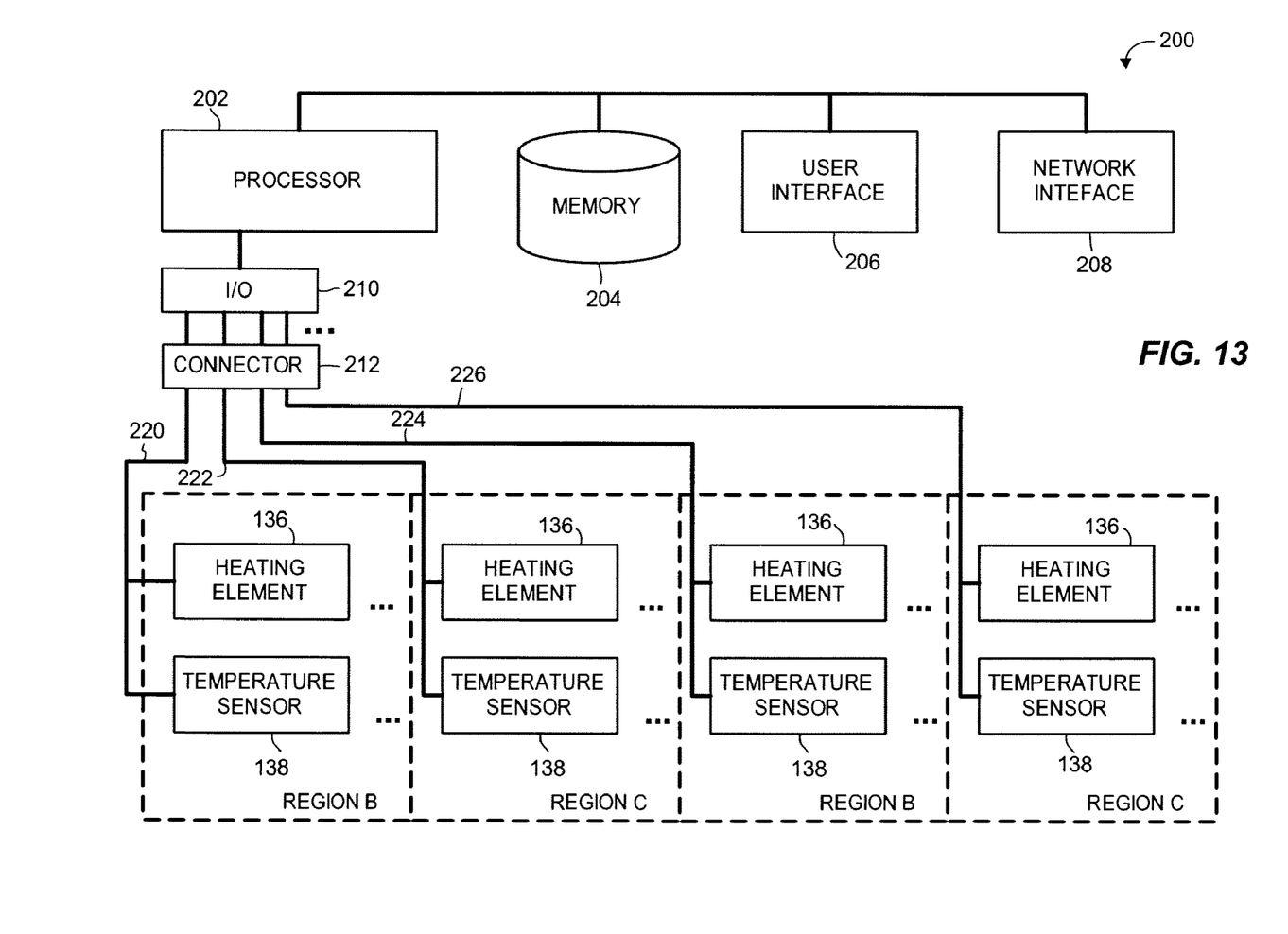
FIG. 13 is a schematic illustration of a control system for monitoring the temperature of the quadrants of the patterned sealing roll and the anvil roll of the present disclosure, and operating heating elements associated with the respective quadrants to maintain sealing strength within desired tolerance ranges.

Referring to FIG. 13, a control system 200 may include a processor 202 communicatively coupled to a memory unit 204, a user interface 206, a network interface 208, and an input/output (I/O) card 210. Further, the processor 202 is communicatively coupled to the heating elements 136 and the thermal sensors 138 disposed in the respective quadrants of both the patterned sealing roll 110 and anvil roll 111. To facilitate wired communications between stationary components (e.g., the I/O card 210) and components moving along a circular trajectory during operation of the sealing roll 110 and anvil roll 111 (e.g., the heating elements 136 and the thermal sensors 138), a rotating electrical connector 212 may be mounted on the corresponding rotatable support arm 114 (see FIG. 5). The rotating electrical connector 212 may be coupled to the I/O card 210, the heating elements 136, and the thermal sensors 138. For ease of illustration, FIG. 13 depicts the B and C regions of the sealing roll 110, and only one communication line 220-226 between each of the four regions and the rotating electrical connector 212. It will be noted, however, that the processor 202 may control one or both of the sealing roll 110 and the anvil roll 111, as well as additional pairs of sealing rolls and anvil rolls, if desired, and that each of the communication lines 220-226 may include one or several wires to carry power and/or control signals. If desired, a pair of rolls including the sealing roll 110 and the anvil roll 111 may be communicatively coupled to the processor 202 via respective rotating electrical connectors 212 and the single I/O card 210.

In operation, the processor 202 transmits control signals to the heating elements 136 and receives feedback signals from the thermal sensors 138 via the I/O card 210 and the rotating electrical connector 212. The processor 202 may separately control the temperature in the B and C regions of the patterned sealing roll 110, for example. In other words, the processor may cause the temperature in one or both B regions to increase or decrease without a substantial change in the temperature of the C regions. The processor 202 preferably maintains the temperature in each of the B regions at approximately the same level, and similarly causes the temperature in each of the C regions to be approximately equal. In some embodiments, the processor 202 generates temperature control signals for one or both of the B and C regions based on a corresponding temperature setpoint and the temperature signal received as feedback from the thermal sensors 138. As discussed in greater detail below, the processor 202 may implement a feedback control loop mechanism (e.g., proportional-derivative (PD) or proportional-integral-derivative (PID)) to maintain the temperature of a target region of the patterned sealing roll 110 by generating or receiving a temperature setpoint, calculating an error signal based on the temperature signal from the thermal sensors 138, and adjusting a control signal to be applied to the corresponding heating element 136. Further, the processor 202 may adjust the temperature setpoint signal in response to a command received from the user interface 206 and/or seal quality data received from the network interface 208.

If desired, the processor 202 may communicate with a testing device (not shown) via the network interface 208. In an embodiment, an Instron® testing machine tests the strength of the wrapper 28. For example, every four hours an Instron® testing machine may apply a progressively stronger force to peel off one inch in the B region of a respective one inch-wide sample, and generate a peak force indication corresponding to the amount of force which can be applied to the sample without damaging the wrapped product. The testing machine then communicates the results of the peel test to the processor 202 via the network interface 208. Alternatively, a technician may manually operate the testing machine and enter the results of peel tests via the user interface 206.

The memory unit 204 may store historical test data, trending data, target strength data, and other information that the control system 200 may use to control the heating elements 136. Using the results of peel testing received from the user interface 206 or the network interface 208, as well target strength data stored in the memory unit 204, the processor 202 may determine whether the temperature in one of both of the B and C regions needs adjustment. The processor 202 may then retrieve new setpoint data from a look-up table, adjust the current setpoint by adding or subtracting a certain value, or otherwise calculate the new setpoint using pre-stored data or programming techniques. Alternatively, the operator may manually enter new temperature setpoints for the B and C regions via the user interface 206. In an embodiment, the processor 202 adjusts the temperature in a C region in view of the desired seal strength, and adjusts the temperature in a B region to maintain a substantially constant temperature differential between the B and C regions. By way of example only, there may be a 17° C. temperature differential between adjacent sealing zones of the sealing roll 110. If desired, the processor 202 may be programmed to maintain distinct temperature differentials between respective sealing zones of the sealing roll 110 and between the various contact regions of the anvil roll 111, such that the control system 200 maintains desired temperature differentials across the gaps 127 along the sealing surface 112 of the sealing roll 110, as well as along the contact surface 113 of the anvil roll 111.

In an embodiment, the processor 202 is a programmable logic controller (PLC) that executes a PID algorithm as ladder logic configured using RSLogix™ 500 software, the thermal sensors 138 are 100-ohm Hotset® 29114 RTDs, and the thermal heaters 136 are Watlow® E1A66-E24T cartridge heaters. The heating elements 136 and the thermal sensors 138 are coupled to the I/O card 210 via a Mercotac® rotating connector. Each of the thermal sensors 138 continuously generates an electrical signal indicative of the temperature in a location in which the thermal sensor 138 is disposed, which corresponds in a predictable manner to temperatures along the respective circular sector of the associated sealing roll 110 or anvil roll 111. Every 50 milliseconds, the processor 202 reads the signal from the I/O card 210 which may be, for example, a Wago® DC card. The signal from the thermal sensor 138 is scaled using the bit field distribute (BTD) instruction and mapped to the process variable of a standard PID instruction, while the control variable of the PID instruction corresponds to the output of the PID instruction. The output percentage parameter of the PID instruction specifies the amount of time, in a particular interval, during which the control system 200 supplies power to the corresponding thermal heater 136.

Generally speaking, the heating element 136 may be a coil, a ceramic- or polymer-based resistor, or any other suitable component. Further, the thermal sensor 138 in some embodiments may be a thermistor rather than an RTD, or any other element capable of generating a signal indicative of temperature. If desired, a heating element and a thermal sensor may be provided as an integral temperature control element. In this embodiment, the controls system 200 may need to only transmit a temperature setpoint to the temperature control element which, in turn, may independently maintain the target temperature. With respect to the processor 202, it is contemplated that some or all of the control logic of the control system 200 may be implemented using software, hardware, and/or firmware components. As one alternative, the processor 202 may be included in any programmable device capable of executing computer instructions such as a personal computer (PC). As some of the other alternatives, the processor 202 may be implemented as an application-specific integrated circuit (ASIC) or as an analog circuit. The signaling between the processor 202 and the components 136-138 may be analog or digital. As yet another alternative, a single processor 202 may be used both in the control system 200 and in controlling the rotation of the patterned sealing roll 110 and/or the anvil roll 111.

In the embodiments discussed above, each of the "cool" B regions associated with small protuberances 122 may include a first number of heating elements 136, and each of the "hot" C regions associated with large protuberances 120 includes a second, larger number of heating elements 136. In this manner, the control system 200 may maintain the C regions at a substantially higher temperature. In other embodiments, the control system 200 may separately control temperature in B and C regions using heating elements of different types in the respective B and C regions, possibly using the number of heating elements in all B and C regions. As one example, the heating elements in the C regions may be more powerful than the heating elements in the B regions. As yet another alternative, each of the B and C regions may include the same number of identical heating elements, but the processor 202 may maintain the heating elements in the C regions in the activated state during longer periods of time.

Figure 14:
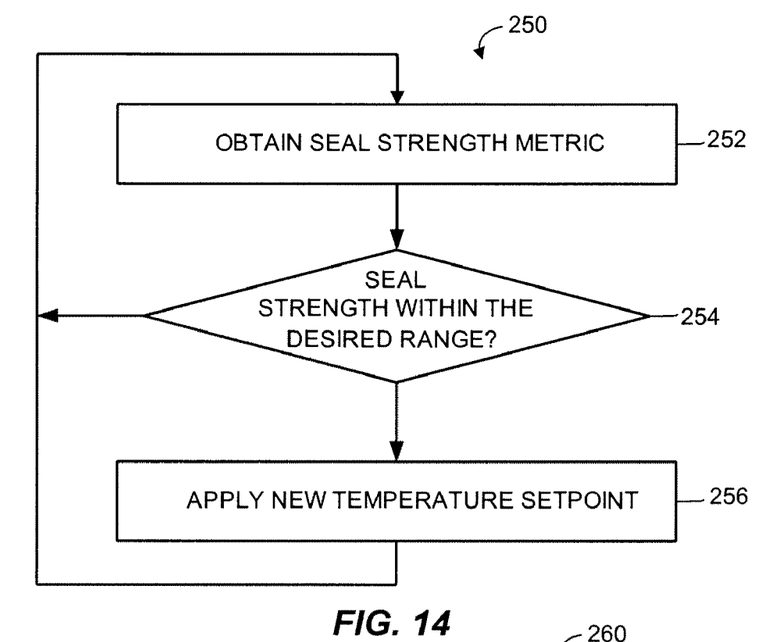
FIG. 14 is a flow diagram of an example method which the control system illustrated in FIG. 13 may implement to control the temperature of a patterned sealing roll or an anvil roll.

Referring to FIG. 14, the processor 202 and/or other components of the control system 200 may implement the method 250 to control the temperature of the patterned sealing roll 110 and/or the anvil roll 111. In block 252, the processor 202 obtains a seal strength metric, i.e., data indicative of the strength of the seal in B and/or C regions. In some embodiments, block 252 may be executed in response to a report from a technician or an automatic testing device. In other embodiments, the processor 202 may run a timer and execute block 252 every four hours, for example. Next, in block 254, the processor 202 may compare the obtained seal strength metric to one or several benchmark values stored in the memory unit 204, for example. If the seal strength metric is within the acceptable range, the method 250 returns to the block 252 to wait for the next measurement. Otherwise, in block 256, the processor 202 calculates or retrieves a new temperature setpoint. Thus, to take one example, the processor 202 may determine that the strength of the seal associated with the C region exceeds the allowable range. In accordance with the method 250, the processor 202 may lower the temperature setpoint in block 256.

Figure 15:
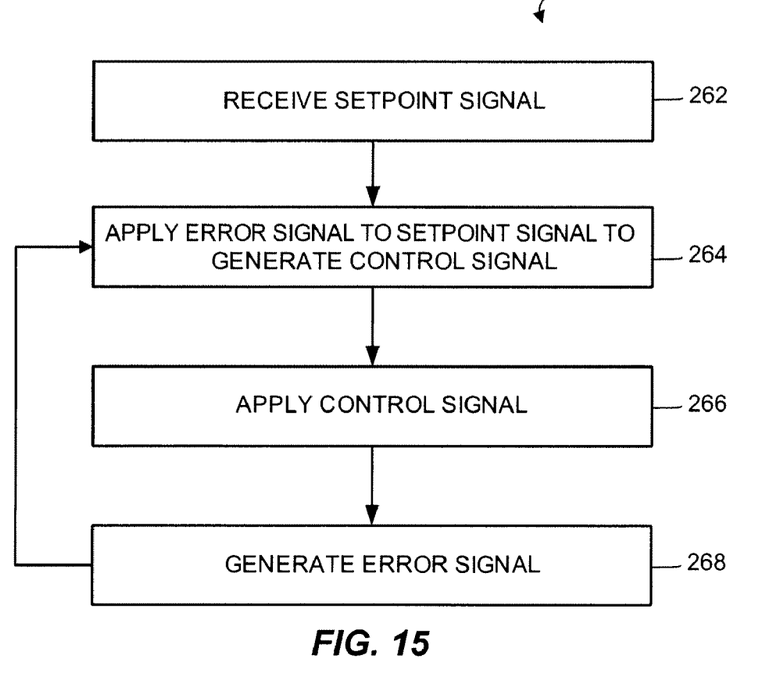
FIG. 15 is a flow diagram of an example method which the control system illustrated in FIG. 13 may implement to maintain a target temperature of a patterned sealing roll or anvil roll.
Figure 16:
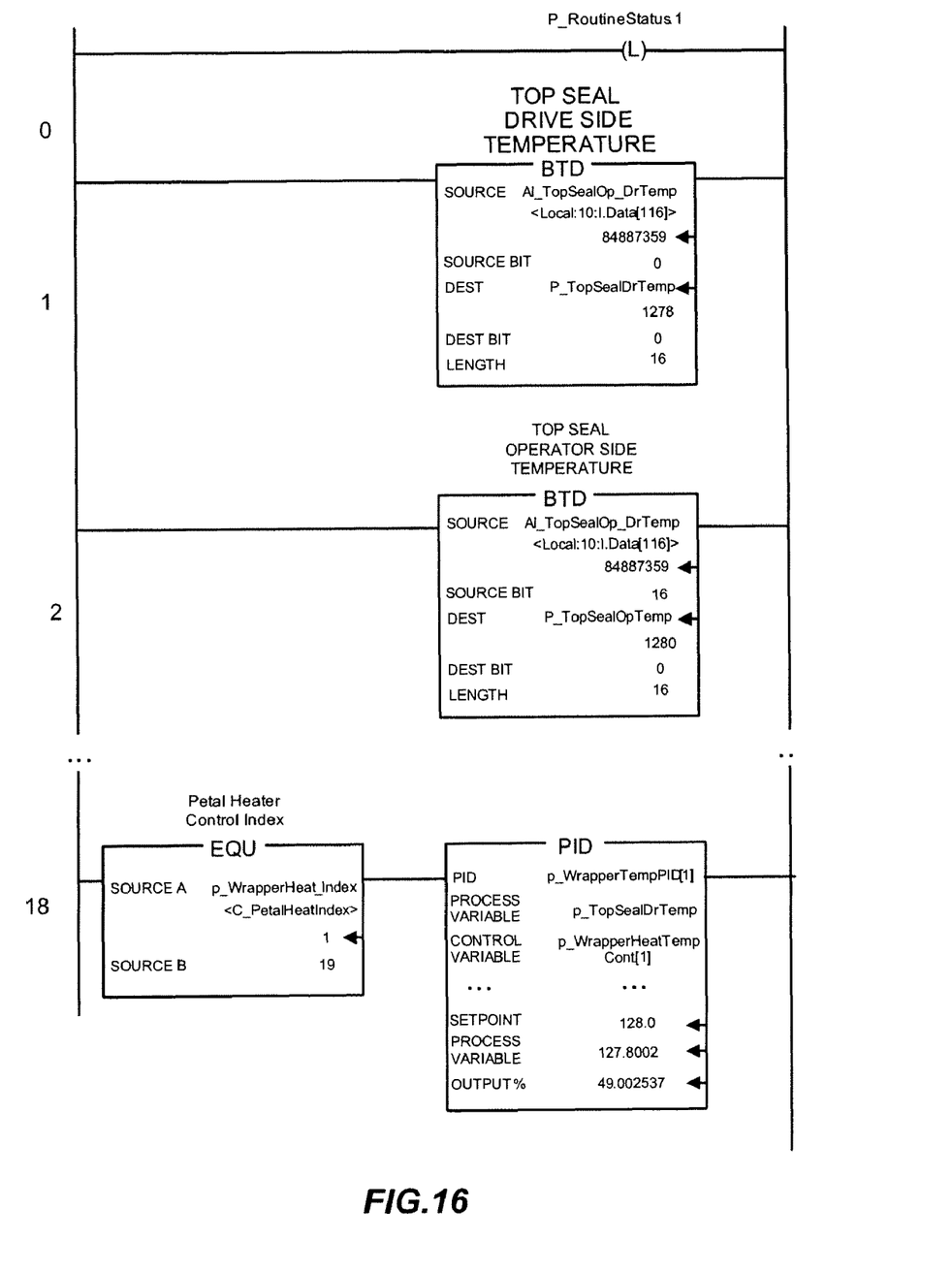
FIG. 16 illustrates a portion of an example ladder logic algorithm which the control system of FIG. 13 may implement to control the temperature in several regions of a patterned sealing roll or anvil roll.

Once the processor 202 calculates or otherwise obtains the new temperature setpoint, the processor 202 may execute a feedback control method 260 (see FIG. 15) to control the temperature of B and C regions. In block 262, the processor 202 may receive a setpoint signal for a particular region B or C. In block 268, the processor may compare the setpoint signal to the signal received from one or several temperature sensors 138 (see FIG. 13) to generate an error signal. Using the error signal generated in block 268, the processor 202 may generate a control signal in block 264 to apply the control signal to the corresponding heating elements 136 in block 266. As indicated above, at least some of the acts associated with the method 260 may be implemented using ladder logic or other programming techniques. FIG. 16 illustrates, in relevant part, one example of an algorithm implemented in ladder logic using RSLogix software for controlling heating elements 136.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for controlling the strength of seals imparted to workpiece layers by a sealing roll and an anvil roll, comprising:

a pair of rotatably-supported rolls, including a sealing roll and an anvil roll arranged on opposing sides of a conveyed web of workpiece layers, wherein the sealing roll comprises one continuous sealing head comprising two or more textured sealing regions, two or more gaps between the sealing regions, and two or more temperature set points, wherein the gaps thermally isolate adjacent sealing regions from one another;

a plurality of heating elements provided on at least one of the rolls;

a plurality of temperature sensors provided on the at least one of the rolls; and a controller in communication with the sensors and the heating elements;

wherein the seal imparted to workpiece layers comprises at least one generally-continuous seal comprising two or more sealing zones, wherein each sealing zone has a peel strength, and wherein the peel strength of one sealing zone is higher than the peel strength of an adjacent sealing zone.

2. The system of claim 1, wherein the the texture of a first of the regions is different from a texture of a second of the regions.

3. The system of claim 1, wherein for each of the gaps separating adjacent textured sealing regions of the sealing roll, there is a corresponding gap of the anvil roll.

4. The system of claim 3, wherein the gaps of the sealing roll are in register with corresponding gaps in the anvil roll.

5. The system of claim 2, wherein the sealing head comprises four or more textured sealing regions, wherein the plurality of heating elements and the plurality of temperature sensors are provided on at least the sealing roll, and wherein the controller is programmed to maintain at least two of the textured sealing regions at substantially the same temperature.

6. The system of claim 1, wherein the sealing regions have a rhomboidal shape.

7. The system of claim 1, wherein the gaps are positioned at an angle other than parallel or perpendicular to the machine direction.

8. A device for controlling the quality of seals imparted to workpiece layers by a roll along a plurality of regions associated with a surface of the roll, the device comprising:

a first input to receive a first temperature signal indicative of a temperature associated with a first one of the plurality of regions;

a second input to receive a second temperature signal indicative of a temperature associated with a second one of the plurality of regions;

a logic module to selectively generate a first temperature control signal based on at least a first temperature setpoint and the first temperature signal, and selectively generate a second temperature control signal based on at least a second temperature setpoint and the second temperature signal;

a first output to transmit the first temperature control signal to the first one of the plurality of regions; and a second output to transmit the second temperature control signal to the second one of the plurality of regions; wherein the second temperature setpoint is not equal to the first temperature setpoint; and wherein the seal imparted to workpiece layers comprises at least one generally-continuous seal comprising two or more sealing zones, wherein each sealing zone has a peel strength, and wherein the peel strength of one sealing zone is higher than the peel strength of an adjacent sealing zone.

9. A system comprising the device of claim 8, further comprising a memory to store the first temperature setpoint and the second temperature setpoint.

10. A system comprising the device of claim 8, wherein the roll is a sealing roll that imparts the seals to at least a pair of workpiece layers, and wherein each of the plurality of regions is a region corresponding to a respective circular sector of the sealing roll; the system further comprising:

a rotating electrical connector to connect the first input, the second input, the first output, and the second output to the first one of the plurality of regions and the second one of the plurality of regions.

11. A system comprising the device of claim 8, further comprising a first set of heating elements disposed in the first one of the plurality of regions of the roll, and a second set of heating elements disposed in the second one of the plurality of regions of the roll; wherein the device transmits the first temperature control signal to the first set of heating elements, and the second temperature control signal to the second set of heating elements.

12. A system comprising the device of claim 8, further comprising a first set of thermal sensors disposed in the first one of the plurality of regions of the roll, and a second set of thermal sensors disposed in the second one of the plurality of regions of the roll; wherein the device receives the first temperature signal from the first set of heating elements, and the second temperature signal from the second set of heating elements.

13. A system comprising the device of claim 8, further comprising a testing device communicatively coupled to the device to generate a metric indicative of the quality of the imparted seals; wherein the device adjusts at least one of the first temperature setpoint or the second temperature setpoint based on the metric.

14. The device of claim 8, including a programmable logic controller that executes a feedback or feedforward loop control algorithm, wherein the control algorithm is associated with generating at least one of a proportional error signal, a derivative error signal, or an integral error signal.

15. A system comprising the device of claim 8, further comprising a user interface communicatively coupled to the device to adjust at least one of the first temperature setpoint or the second temperature setpoint.

16. The device of claim 8, wherein the regions have a rhomboidal shape.

* * * * *